(12) United States Patent
Vijendra et al.

(10) Patent No.: US 11,106,560 B2
(45) Date of Patent: Aug. 31, 2021

(54) ADAPTIVE THRESHOLDS FOR CONTAINERS

(71) Applicant: EMC IP Holding Company LLC, Hopkinton, MA (US)

(72) Inventors: Sudhir Vijendra, Westborough, MA (US); Shashidhar Krishnaswamy, White Plains, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 699 days.

(21) Appl. No.: 16/016,103

(22) Filed: Jun. 22, 2018

(65) Prior Publication Data

US 2019/0391897 A1    Dec. 26, 2019

(51) Int. Cl.
*G06F 11/00* (2006.01)
*G06F 11/34* (2006.01)
*G06F 11/30* (2006.01)
*G06N 20/00* (2019.01)

(52) U.S. Cl.
CPC ...... *G06F 11/3409* (2013.01); *G06F 11/3024* (2013.01); *G06N 20/00* (2019.01)

(58) Field of Classification Search
CPC ............. G06F 11/0754; G06F 11/3409; G06F 11/3428; G06F 11/3447; G06F 11/3452
See application file for complete search history.

(56) References Cited

U.S. PATENT DOCUMENTS

| | | | | |
|---|---|---|---|---|
| 9,794,287 B1 * | 10/2017 | Koster | | G06F 21/552 |
| 10,244,034 B2 * | 3/2019 | Joshi | | H04L 41/5035 |
| 10,372,525 B2 * | 8/2019 | Zhao | | G06F 3/0653 |
| 10,484,301 B1 * | 11/2019 | Shukla | | H04L 41/0896 |
| 10,614,380 B2 * | 4/2020 | Poitras | | G06F 11/302 |
| 10,635,519 B1 * | 4/2020 | Tang | | G06F 11/3447 |
| 10,747,568 B2 * | 8/2020 | Ahmed | | H04L 41/147 |
| 10,824,726 B1 * | 11/2020 | Saffar | | G06F 21/566 |
| 10,884,805 B2 * | 1/2021 | Huang | | G06F 11/3452 |

(Continued)

OTHER PUBLICATIONS

C. Yan et al., "High-Performance Elastic Management for Cloud Containers Based on Predictive Message Scheduling," Future Internet, Dec. 2017,13 pages, vol. 9, No. 4.

*Primary Examiner* — Elmira Mehrmanesh
(74) *Attorney, Agent, or Firm* — Ryan, Mason & Lewis, LLP

(57) ABSTRACT

A method includes identifying container metrics for containers running in a container environment, collecting container data for the containers, and generating an adaptive threshold for a given one of the identified container metrics. The adaptive threshold specifies one or more values for the given container metric for a designated time period. The adaptive threshold is generated utilizing a scoring algorithm that determines a range of accepted container behavior for the designated time period by analyzing the collected container data using one or more machine learning algorithms. The method also includes monitoring behavior of the containers during the designated time period utilizing the adaptive threshold, and generating an alert responsive to detecting that the monitored behavior of a given one of the containers is outside the range of accepted container behavior for the designated time period specified by the given adaptive threshold for the given container metric.

20 Claims, 10 Drawing Sheets

(56) References Cited

U.S. PATENT DOCUMENTS

| | | | |
|---|---|---|---|
| 10,936,717 B1* | 3/2021 | Saffar | G06F 9/5077 |
| 10,951,651 B1* | 3/2021 | Golan | H04L 63/1425 |
| 2004/0205101 A1* | 10/2004 | Radhakrishnan | G06F 9/5083 |
| | | | 709/200 |
| 2008/0174426 A1 | 7/2008 | Hackworth et al. | |
| 2011/0098973 A1* | 4/2011 | Seidman | G06F 11/3409 |
| | | | 702/179 |
| 2015/0081880 A1* | 3/2015 | Eaton | H04L 43/0817 |
| | | | 709/224 |
| 2016/0300142 A1* | 10/2016 | Feller | G06N 20/00 |
| 2016/0350173 A1* | 12/2016 | Ahad | G06F 11/0751 |
| 2017/0078442 A1 | 3/2017 | Pacella et al. | |
| 2017/0199770 A1 | 7/2017 | Peteva et al. | |
| 2018/0359160 A1* | 12/2018 | Calo | H04L 41/065 |
| 2019/0156047 A1* | 5/2019 | Daniel | G06F 9/44505 |

* cited by examiner

| | KEY METRIC | DESCRIPTION | DEFAULT STATIC THRESHOLD |
|---|---|---|---|
| 1 | RUNNING PODS, AVAILABLE PODS, UNAVAILABLE PODS | STATE OF POD AND CONTAINER IMAGES | AVAILABILITY FOR THE LAST 15 MINUTES |
| 2 | CPU USAGE, NODE CPU CAPACITY, MEMORY USAGE, NODE MEMORY CAPACITY, FILE SYSTEM USAGE, DISK I/O | RESOURCE UTILIZATION PER POD | CPU USAGE ABOVE 75%, MEMORY USAGE LESS THAN 50% FOR LAST 2 HOURS OF 12 HOUR WINDOW, MEMORY UTILIZATION > 90% |
| 3 | NETWORK IN, NETWORK OUT, NETWORK TRAFFIC VOLUME, NETWORK TRAFFIC COUNT, DROPPED PACKETS | NETWORK UTILIZATION PER POD | DROPPED PACKET ERRORS > 0.5% |
| 4 | SESSION ERRORS, RESPONSE TIMES, ERROR RATES, GARBAGE COLLECTION | APPLICATION METRICS PER POD | RESPONSE TIME > 5 SECONDS |

FIG. 3

| LAST SEEN DATE AND TIME | CONTAINER IDENTIFIER | UTILIZATION METRIC |
|---|---|---|
| 5/11/2018 @ 2:57PM | CONTAINER-PROD | 20% |
| 5/11/2018 @ 3:57PM | CONTAINER-PROD | 40% |
| 5/11/2018 @ 4:57PM | CONTAINER-PROD | 70% |
| 5/11/2018 @ 5:57PM | CONTAINER-PROD | 80% |
| 5/11/2018 @ 6:57PM | CONTAINER-PROD | 40% |
| 5/11/2018 @ 7:57PM | CONTAINER-PROD | 30% |

ADAPTIVE THRESHOLDS FOR CONTAINERS

FIELD

The field relates generally to information processing systems, and more particularly to management of container environments.

BACKGROUND

Information processing systems increasingly utilize reconfigurable virtual resources to meet changing user needs in an efficient, flexible and cost-effective manner. For example, cloud computing and storage systems implemented using virtual machines have been widely adopted. Other virtual resources now coming into use in information processing systems include Linux containers. Such containers may be used to provide at least a portion of the virtualization infrastructure of a given information processing system. However, significant challenges arise in deployment of virtualization infrastructure, including in managing container environments.

SUMMARY

Illustrative embodiments of the present invention provide techniques for managing container environments through the use of adaptive thresholds. Embodiments advantageously provide enhanced performance for containers and efficient utilization of physical infrastructure used to implement containers in a container environment.

In one embodiment, a method comprises identifying a set of container metrics for a plurality of containers running in a container environment, collecting container data for the plurality of containers, and generating an adaptive threshold for at least a given one of the identified container metrics. The adaptive threshold specifies one or more values for the given container metric for a designated time period. The adaptive threshold is generated utilizing a scoring algorithm that determines a range of accepted container behavior for the designated time period by analyzing the collected container data using one or more machine learning algorithms. The method also comprises monitoring behavior of the plurality of containers during the designated time period utilizing the adaptive threshold, and generating an alert responsive to detecting that the monitored behavior of at least a given one of the plurality of containers is outside the range of accepted container behavior for the designated time period specified by the given adaptive threshold for the given container metric. The method is performed by at least one processing device comprising a processor coupled to a memory.

These and other illustrative embodiments include, without limitation, methods, apparatus, networks, systems and processor-readable storage media.

BRIEF DESCRIPTION OF THE DRAWINGS

FIG. 3 shows a table of metrics that may be used to monitor and manage containers in an illustrative embodiment.

FIG. 8 shows a container metric data set for use in generating an adaptive threshold in an illustrative embodiment.

DETAILED DESCRIPTION

Figure 1:
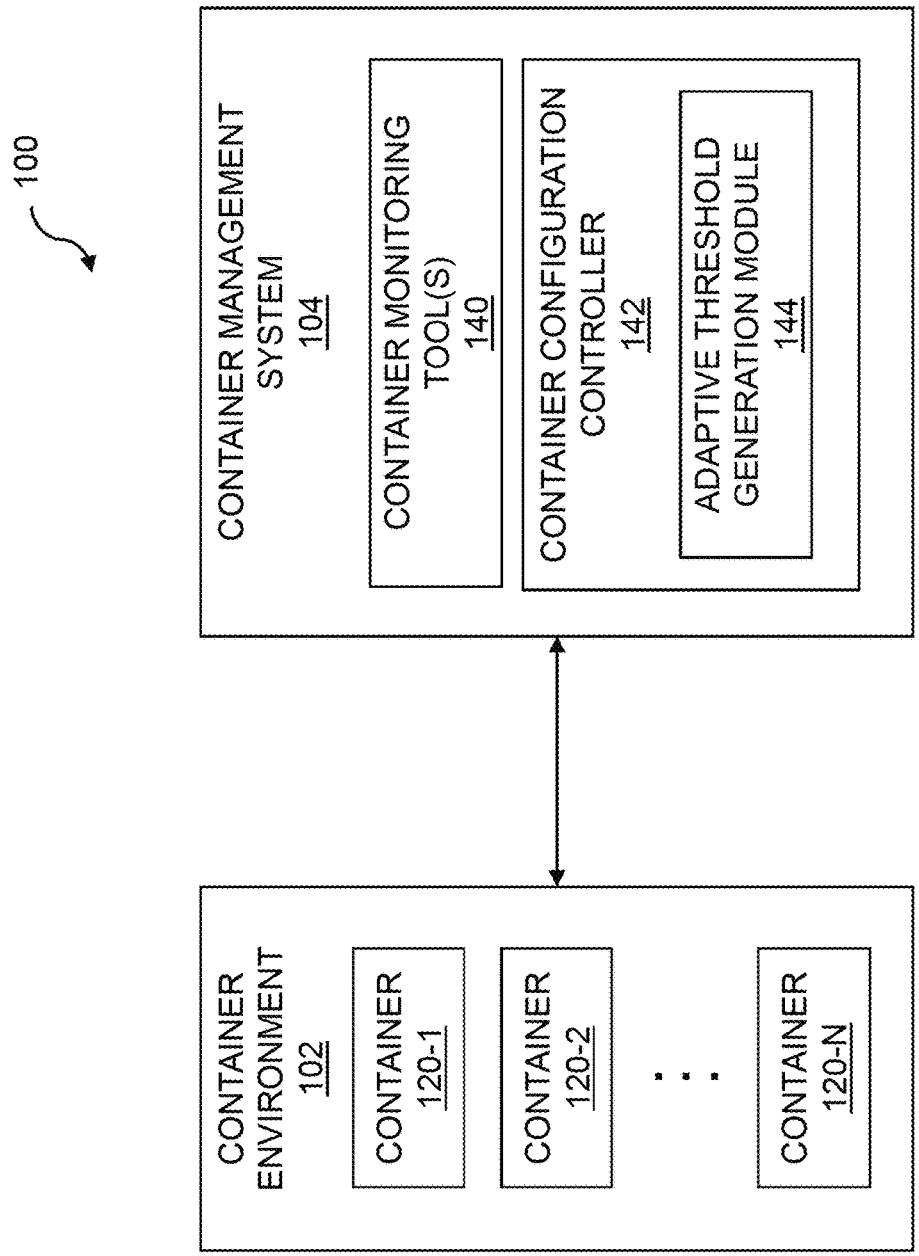
FIG. 1 is a block diagram of an information processing system including a container environment and a container management system in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As discussed above, information processing systems are increasingly utilizing reconfigurable virtual resources such as virtual machines (VMs) and containers. Containers provide operating system (OS)-level virtualization, in which the OS kernel allows the existence of multiple isolated user-space instances. Such instances may look like real computers from the point of view of programs or applications running in the containers. Advantageously, containers avoid the overhead of starting and maintaining VMs.

A container is a lightweight, stand-alone, executable package of a piece of software that includes everything needed to run the piece of software. The container structure has great appeal for isolating software from its surroundings, and helps reduce conflicts between different tenants or users running different software on the same underlying infrastructure. The term "user" herein is intended to be broadly construed so as to encompass numerous arrangements of human, hardware, software or firmware entities, as well as combinations of such entities.

In some embodiments, containers are implemented as Docker containers or other types of Linux containers (LXCs). Such Docker containers and other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature.

Clusters of containers can be managed across multiple container host devices using container cluster managers such as Docker Swarm® or Kubernetes®.

VM environments may include advanced management tools, where VM operational metrics are defined and managed. VM management platforms may further provide features for setting thresholds that govern operation and performance of VMs in a VM environment. Container environments may similarly include container metrics that are defined and managed, but lack sophisticated management systems for managing thresholds that govern operation and performance of the containers in a container environment. Thus, there is a need for container management systems configured to set dynamic or adaptive thresholds for containers. In some embodiments, dynamic thresholds are driven by artificial intelligence (AI), such as using various AI or machine learning algorithms. Dynamic or adaptive thresholds may be based on several parameters, such as the time, day, month, etc., resource size at a particular time, day, month, etc.

Operators of an information processing system, such as an information technology (IT) datacenter, need a sophisticated way to identify the optimal (e.g., day-to-day, hour-by-hour, minute-by-minute, etc.) range of normal behavior—a dynamic or adaptive threshold—for each of a set of performance metrics monitored in a container infrastructure or environment. This is important for a number of tasks, including predicting any abnormalities which can be early indicators of emerging problems requiring the attention of IT operations personnel or other authorized users or entities. Adaptive thresholds may also be used for more efficient allocation of resources to containers.

FIG. 1 shows an information processing system 100 including a container infrastructure or environment 102 that includes multiple containers 120-1, 120-2, . . . 120-N (collectively, containers 120). The container environment 102 may include one or more container host devices hosting the containers 120.

A container management system 104 is coupled to the container environment 102. The container management system 104 includes container monitoring tools 140 configured to monitor various metrics for the containers 120 running in the container environment 102. The container management system 104 further includes a container configuration controller 142 configured to set thresholds and other parameters which control operation of the containers 120 running in the container environment 102.

The container configuration controller 142 includes an adaptive threshold generation module 144, configured to utilize various AI-driven or machine learning algorithms for predicting expected levels or thresholds for various container metrics for a given time period. Such algorithms may include one or more algorithms that detect linear behavior patterns for a range of metric values. As an example, such algorithms may be used to detect disk utilization per pod, where a pod is a group of containers deployed together on the same container host device. A pod may be a group of Docker containers in a Kubernetes® container orchestration system. In some cases, a pod may contain a group of containers that represent multiple cooperating processes that form a cohesive service which simplifies application deployment and management. The pod enables data sharing and communication among the constituents thereof, such as sharing a network namespace and sharing storage volumes. Algorithms may also be used to detect metrics that have only two states. As an example, these algorithms may be used to detect availability of a pod. Further, some algorithms may be used to detect metrics that have a discrete set of values. For example, these algorithms may be used to detect a number of pod connections, a number of active pods, etc. The various algorithms may use classification, clustering and other techniques described in further detail below.

In some embodiments, the adaptive threshold generation module 144 is configured to run periodically (e.g., every minute, every hour, every 12 hours, every day, every week, etc.), to set new adaptive or dynamic thresholds for each of a set of container metrics for an upcoming time period (e.g., for a next hour, a next 12 hours, a next day, a next week, etc.). It should be appreciated that the adaptive or dynamic thresholds may be generated or updated at different time intervals or time periods for different types or ones of the container metrics. For example, a first adaptive threshold for a first container metric may be updated every hour while a second adaptive threshold for a second container metric may be updated every 12 hours. In other embodiments, however, multiple container metrics or all container metrics are updated at a same time for a same time period.

The container environment 102 and container management system 104 may be part of cloud infrastructure such as an Amazon Web Services (AWS) system. Other examples of cloud-based systems that can be used to provide container environment 102 and container management system 104 include Google Cloud Platform (GCP) and Microsoft Azure.

The container environment 102 and container management system 104 in the FIG. 1 embodiments are assumed to be implemented using at least one processing platform each comprising one or more processing devices each having a processor coupled to a memory. Such processing devices can illustratively include particular arrangements of compute, storage and network resources.

The container environment 102 and container management system 104 may be implemented on respective distinct processing platforms, although numerous other arrangements are possible. For example, in some embodiments at least portions of the container environment 102 and container management system 104 are implemented on the same processing platform. The container management system 104 can therefore be implemented at least in part within at least one processing platform that implements at least a portion of the container environment 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the container environment 102 and container management system 104, or portions or components thereof, to reside in different data centers. Numerous other distributed implementations of one or both of the container environment 102 and container management system 104 are possible. Accordingly, the containers 120 of container environment 102, and/or the container management system 104 can also be implemented in a distributed manner across multiple data centers.

Additional examples of processing platforms utilized to implement containers, container environments and container management systems in illustrative embodiments will be described in more detail below in conjunction with FIGS. 9 and 10.

It is to be appreciated that these and other features of illustrative embodiments are presented by way of example only, and should not be construed as limiting in any way.

Accordingly, different numbers, types and arrangements of system components such as container environment 102 and container management system 104 can be used in other embodiments. Although FIG. 1 shows an arrangement wherein the container management system 104 is coupled to just one container environment 102, in other embodiments the container management system 104 may be coupled to or configured for managing multiple distinct container environments, possibly running on different physical infrastructure, which are part of distinct data centers, cloud computing environments, etc. The adaptive threshold generation module 144 may generate adaptive thresholds for the containers in each distinct container environment separately or at the same time if desired. Also, in some embodiments multiple container management systems may be coupled to the same container environment, possibly for managing operation of distinct subsets of the containers running therein.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing adaptive threshold generation functionality will be described below.

At least portions of the container management system 104, including container monitoring tools 140, container configuration controller 142 and adaptive threshold generation module 144 may be implemented at least in part in the form of software that is stored in memory and executed by a processor.

Figure 2:
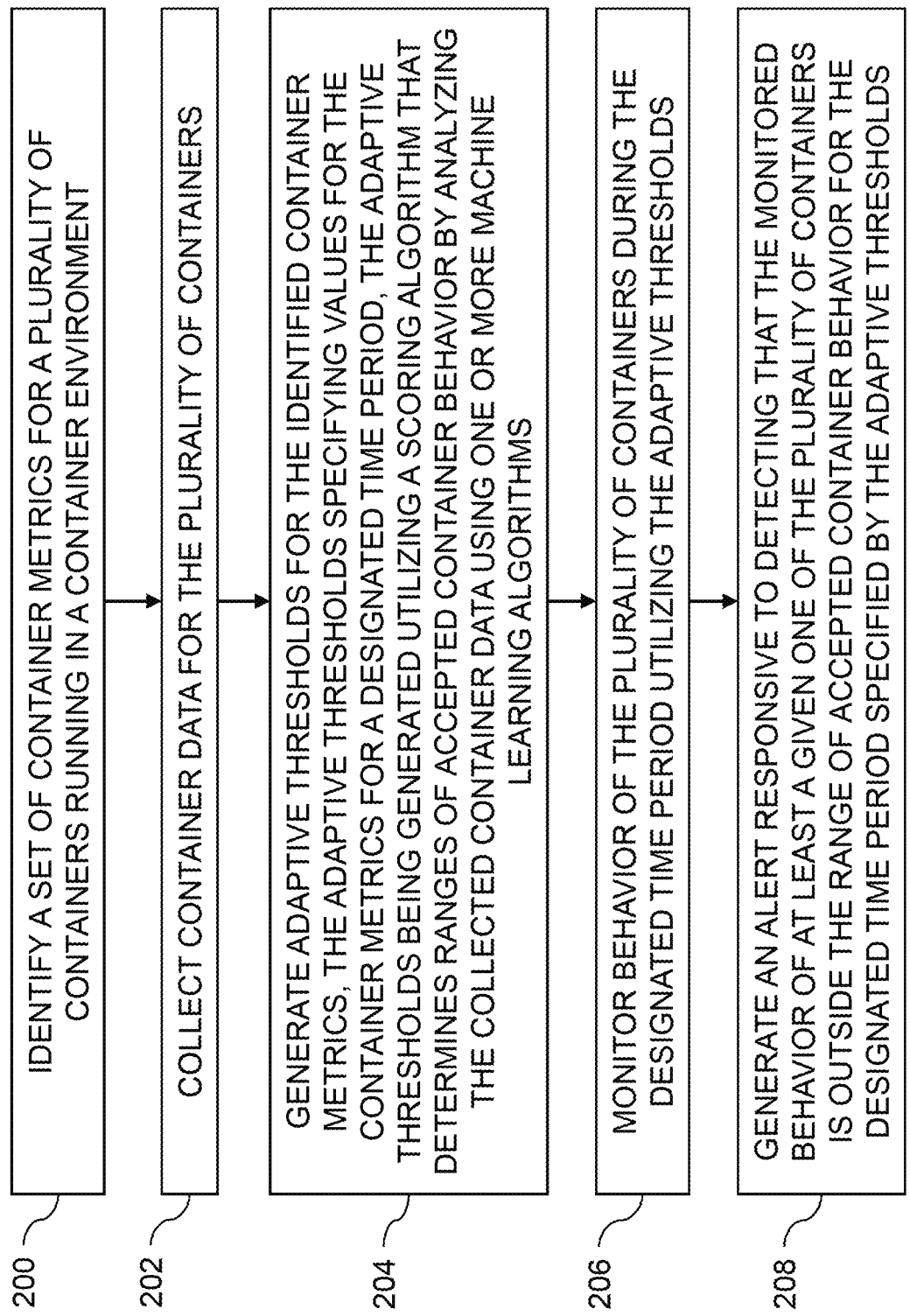
FIG. 2 is a flow diagram of an exemplary process for managing a container environment using adaptive thresholds for containers in an illustrative embodiment.

An exemplary process for generating adaptive thresholds for containers will now be described in more detail with reference to the flow diagram of FIG. 2. It is to be understood that this particular process is only an example, and that additional or alternative processes for generating adaptive thresholds for containers can be carried out in other embodiments.

In this embodiment, the process includes steps 200 through 208. These steps are assumed to be performed by the container management system 104 utilizing adaptive threshold generation module 144. The process begins with step 200, identifying a set of container metrics for containers 120 running in a container environment 102. The identified set of container metrics may include state metrics (e.g., a number of running containers, a number of available containers, a number of unavailable containers, etc.), resource utilization metrics (e.g., central processing unit (CPU) usage, CPU capacity, memory usage, memory capacity, file system usage, storage input/output (I/O), etc.), network utilization metrics (e.g., network traffic in, network traffic out, network traffic volume, network traffic count, dropped packets, etc.) and application metrics (e.g., session errors, response times, error rates, etc.). The identified set of container metrics may be set by a user, such as through specification of container metrics or desired adaptive thresholds through the use of a threshold definition service as described in further detail below with respect to FIG. 6.

In step 202, container data for the containers 120 is collected, such as using container monitoring tools 140 of container management system 104. The container data may be obtained from a metric repository or data store where the container monitoring tools 140 or other tools store information regarding containers 120 in container environment 102, or may be provided as telemetry data directly from container monitoring tools 140. The collected container data may include historical data, such as container metrics measured over a variety of times of the day, during weekdays and weekends, during different seasons, etc. This is useful in generating adaptive thresholds that account for variations in normal behavior at different designated time periods. For example, container utilization may vary by time of day (e.g., it may be greater during normal business hours than during the evening or overnight). Adaptive thresholds can account for the variation in normal behavior by considering container data from different times of the day. Similarly, container usage may vary depending on the day of the week, or between weekdays and weekends, etc. Further, container usage may vary based on seasonal factors. As an example, containers that are used to implement a consumer website may experience different traffic and usage during sales periods, holiday seasons, after new product announcements, etc.

Step 202 may include classifying container data by type or associating container data with different types of container metrics. Step 202 may also include clustering this classified container data by time period. The clustered container data may then be aggregated to key performance indicators (KPIs) for the containers.

In step 204, adaptive thresholds are generated for the container metrics identified in step 200. The adaptive thresholds specify values for the container metrics (e.g., upper and lower bounds of what is considered accepted or normal behavior) for a designated time period (e.g., for a next 12 hours). The adaptive thresholds in some embodiments are generated utilizing a scoring algorithm that determines ranges of accepted container behavior by analyzing the container data collected in step 202 using one or more machine learning or AI-driven algorithms. Such algorithms may include, by way of example, a zero rule classification algorithm, a clustering algorithm, a binomial distribution algorithm, etc.

In step 206, the behavior of the containers 120 is monitored using the adaptive thresholds. It should be appreciated that steps 204 and 206 may be repeated for each of a number of designated time periods, where the adaptive thresholds defining accepted container behavior vary from one designated time period to another. For example, each time period may have a set duration (e.g., 12 hours), and the adaptive threshold may change from one time period to the next. The change in adaptive threshold may be based on new container data that is collected, as step 202 in some embodiments is performed continuously or periodically (e.g., the collected container data may be updated before computing the adaptive threshold for a subsequent time period).

Alerts are generated in step 208 responsive to the monitoring in step 206. For example, on detecting that the monitored behavior of one or more containers is outside the range of accepted container behavior as specified by the adaptive thresholds for the container metrics, an alert may be provided to a specified user or authorized personnel (e.g., an IT administrator, architect or operator of container environment 102). Alerts generated in step 208 may be in the form of reports that are periodically provided to IT operations specialists associated with the container environment 102.

In some embodiments, alerts generated in step 208 trigger remedial action. Such remedial action may include, by way of example, spawning or creating additional containers on a same or additional container host device to handle increased load, taking down or stopping running containers if utilization is low, etc. The remedial action may also or alternatively include migrating containers from one container host device to another (e.g., to a container host device with more available resources). Remedial action may further or alternatively include adjusting resource allocation to containers running on one or more container host devices (e.g., increasing or decreasing CPU, memory, storage, networking or other resources allocated to one or more containers). Various other remedial action may be taken in response to alerts generated in step 208 in other embodiments.

FIG. 3 shows a table 300 with various container metrics and associated thresholds that may be utilized in some embodiments. It should be appreciated, however, that embodiments are not limited to use solely with the specific container metrics or thresholds shown in table 300. The table 300 includes various container metrics that relate to the state of a pod and container images, such as container metrics for running pods, available pods, unavailable pods, etc. Default static thresholds for such container metrics may include availability for a last 15 minutes or other designated time period.

Table 300 also includes various metrics that relate to resource utilization per pod, such as CPU usage, node CPU capacity, memory usage, node memory capacity, file system usage, disk I/O, etc. Default static thresholds for such container metrics may include CPU usage above 75%, memory usage less than 50% (e.g., for a last 2 hours of a 12 hour window), memory utilization greater than 90%, etc.

Table 300 further includes various metrics relating to network utilization per pod, such as network in, network out, network traffic volume, network traffic count, dropped packets, etc. Default static thresholds for such metrics may include dropped packet errors greater than 0.5%. Table 300 also includes various metrics that relate to application metrics per pod, such as session errors, response times, error rates, garbage collection, etc. Default static thresholds for such metrics may include response time greater than 5 seconds.

Figure 4:
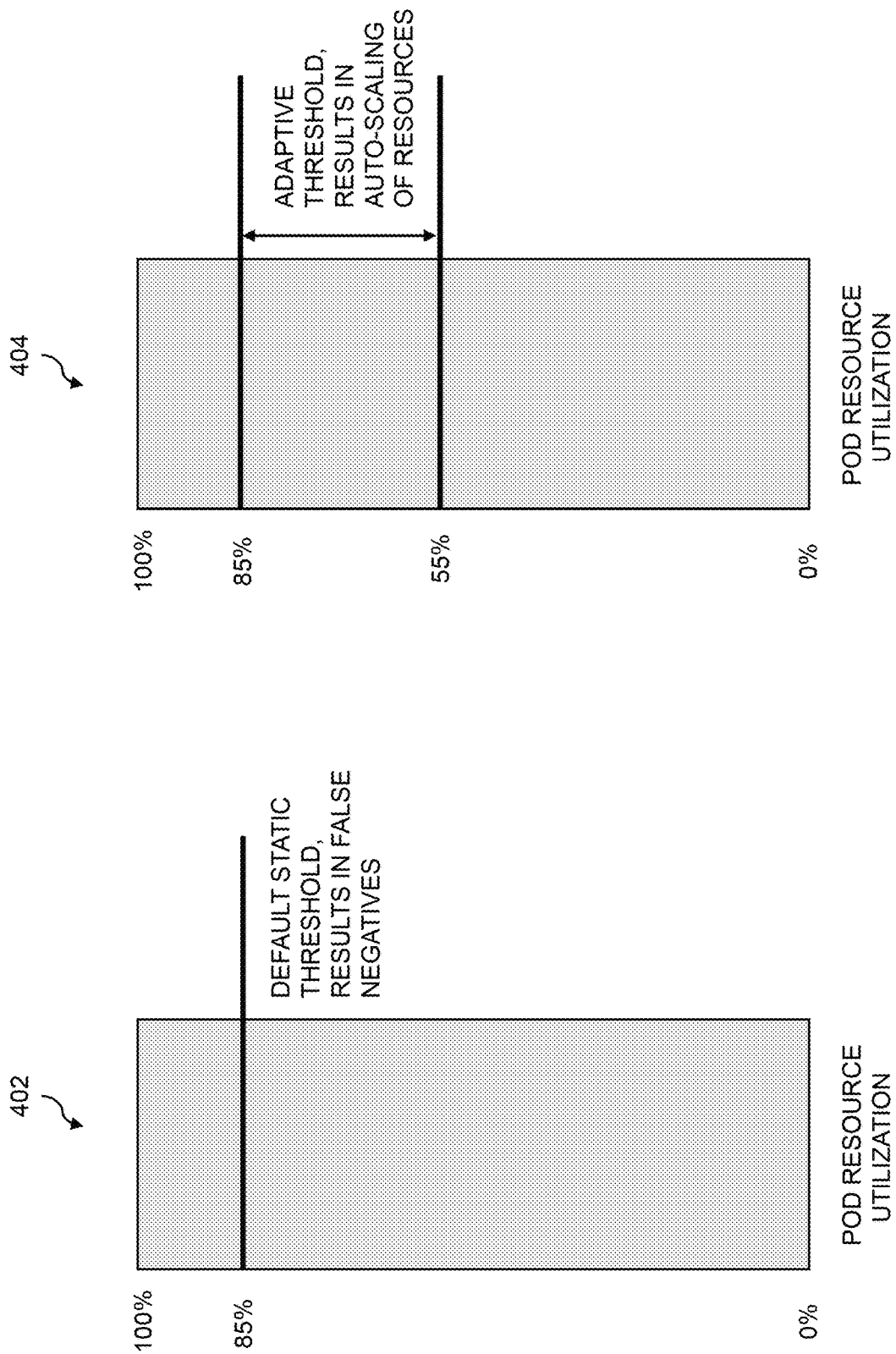
FIG. 4 shows examples of static and adaptive thresholds in an illustrative embodiment.

FIG. 4 shows examples of static and adaptive thresholds, particular for pod resource utilization such as may be set in a Kubernetes® container orchestration system. FIG. 4 shows an example of a static or default threshold 402 for pod resource utilization (e.g., 85%). This default static threshold, however, may result in false negatives, as it may not account for normal variation in container behavior. FIG. 4 also shows an example of an adaptive or dynamic threshold 404 for pod resource utilization, which permits auto-scaling of resources (e.g., between 55% and 85%). The adaptive or dynamic threshold 404 may be AI-driven, and updated periodically (e.g., every 12 hours) to account for variation in normal behavior over time.

Figure 5:
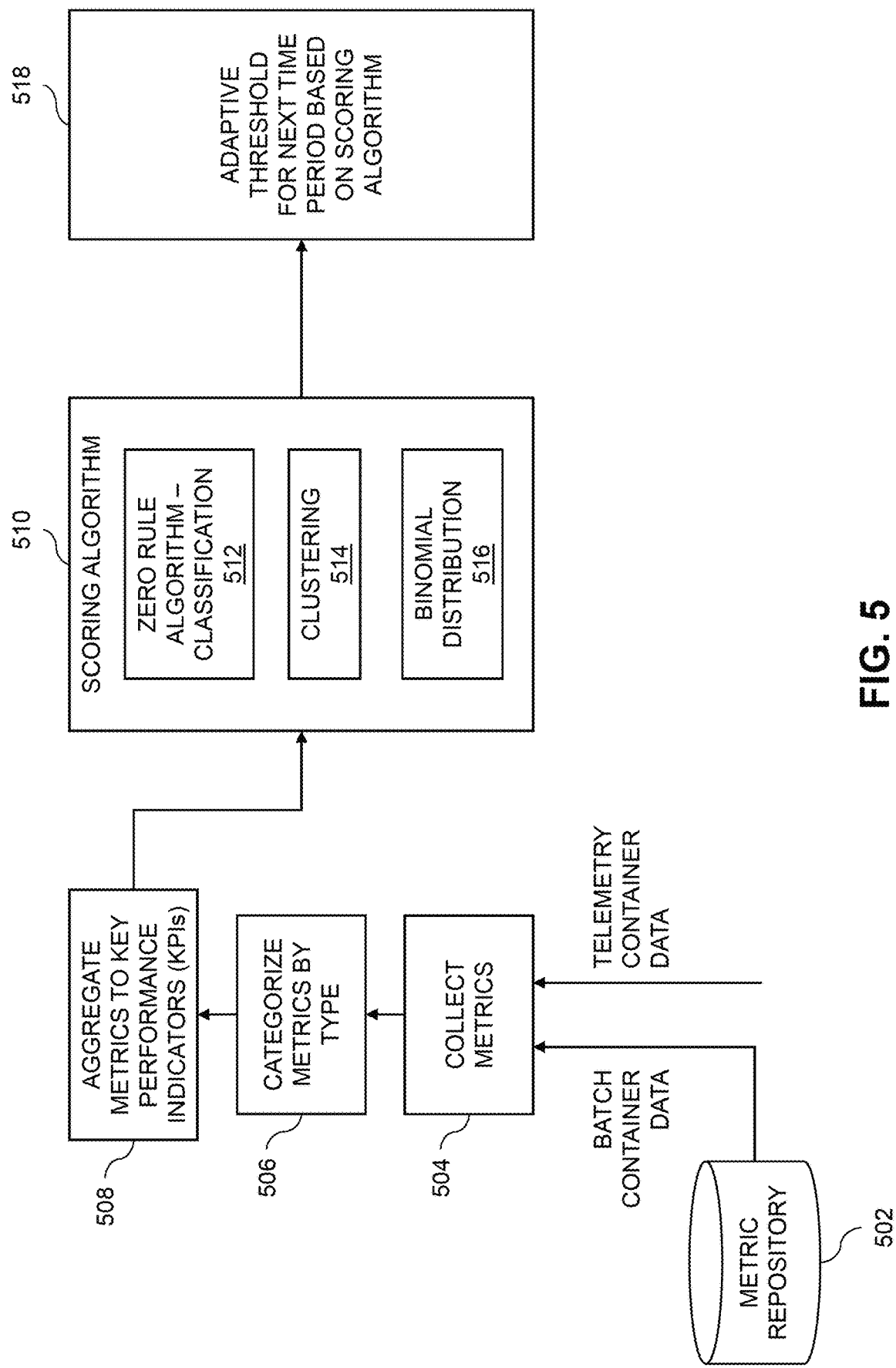
FIG. 5 shows a data flow for generating adaptive thresholds for containers in an illustrative embodiment.

FIG. 5 shows a data flow for generating adaptive thresholds for containers, which may be performed by the container management system 104 of information processing system 100. The flow begins with step 504, collecting metrics using the container monitoring tools 140. The collected metrics may include batch container data from a metric repository 502 as well as telemetry container data from monitoring the containers 120 in container environment 102. In some embodiments, the batch container data includes historical data, such as information regarding various container metrics (e.g., CPU usage, node CPU capacity, node memory capacity, network traffic volume, etc.) for a same day in the last week, month, year, etc. Such historical information may be useful for predicting normal or accepted container behavior for a designated time period (e.g., a next 12 hours). This historical or batch container data from the metric repository 502 is used in combination with the telemetry data for a current or most recent time period, which may similarly include container metrics or data from which container metrics may be derived for the current or most recent time period. Various container monitoring tools may be used to gather the telemetry data. Datadog® and Prometheus® are examples of such container monitoring tools.

In some embodiments, the metric repository 502 and other repositories and data stores described herein may be implemented using at least one storage system. Such a storage system may comprise a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The flow continues with step 506, categorizing the metrics by type. The table 300 of FIG. 3 shows different types of container metrics, such as those relating to state of pods and container images, resource utilization per pod, network utilization per pod, and application metrics per pod. The categorized metrics are then aggregated to generate KPIs in step 508. Various techniques may be used to aggregate the metrics, such as summing, averaging, using the minimum or maximum, a $95^{th}$ or other percentile, utilizing standard deviation, etc. Various KPIs may be used as desired for a particular implementation. Network resource utilization and network latency for a designated time period are examples of KPIs. Such KPIs may be in the form of the average, maximum or sum of network resource utilization or network latency for a last hour, last week or other designated time period.

The aggregated metrics are utilized by a scoring algorithm in step 510. The scoring algorithm may utilize various methods for determining ranges of normal behavior, such as using the zero rule algorithm for classification in step 512, clustering techniques (e.g., K-means clustering, mean shift clustering, density-based spatial clustering of applications with noise (DB SCAN), hierarchical clustering, etc.) in step 514, and binomial distribution in step 516. The scoring algorithm 510 uses the zero rule algorithm 512, clustering 514 and binomial distribution 516 to determine a range of normal behavior for a particular time period. As a result of the scoring algorithm computation in step 510, adaptive thresholds for a next time period are generated in step 518. The adaptive threshold for a given container metric may include, for example, upper and lower metric thresholds for use during a next time period (e.g., a next 12 hours). The scoring algorithm provides a method for combining predictions using the various AI-driven algorithms (e.g., zero rule algorithm 512, clustering 514 and binomial distribution 516). In some embodiments, the scoring algorithm uses an average weighted score from the zero rule algorithm 512, clustering 514 and binomial distribution 516. Each of the zero rule algorithm 512, clustering 514 and binomial distribution 516 may be used to generate a different prediction of the range of normal or accepted behavior for a container metric for a designated time period. The scoring algorithm 510 weights or combines these various predictions to generate the adaptive threshold.

Figure 6:
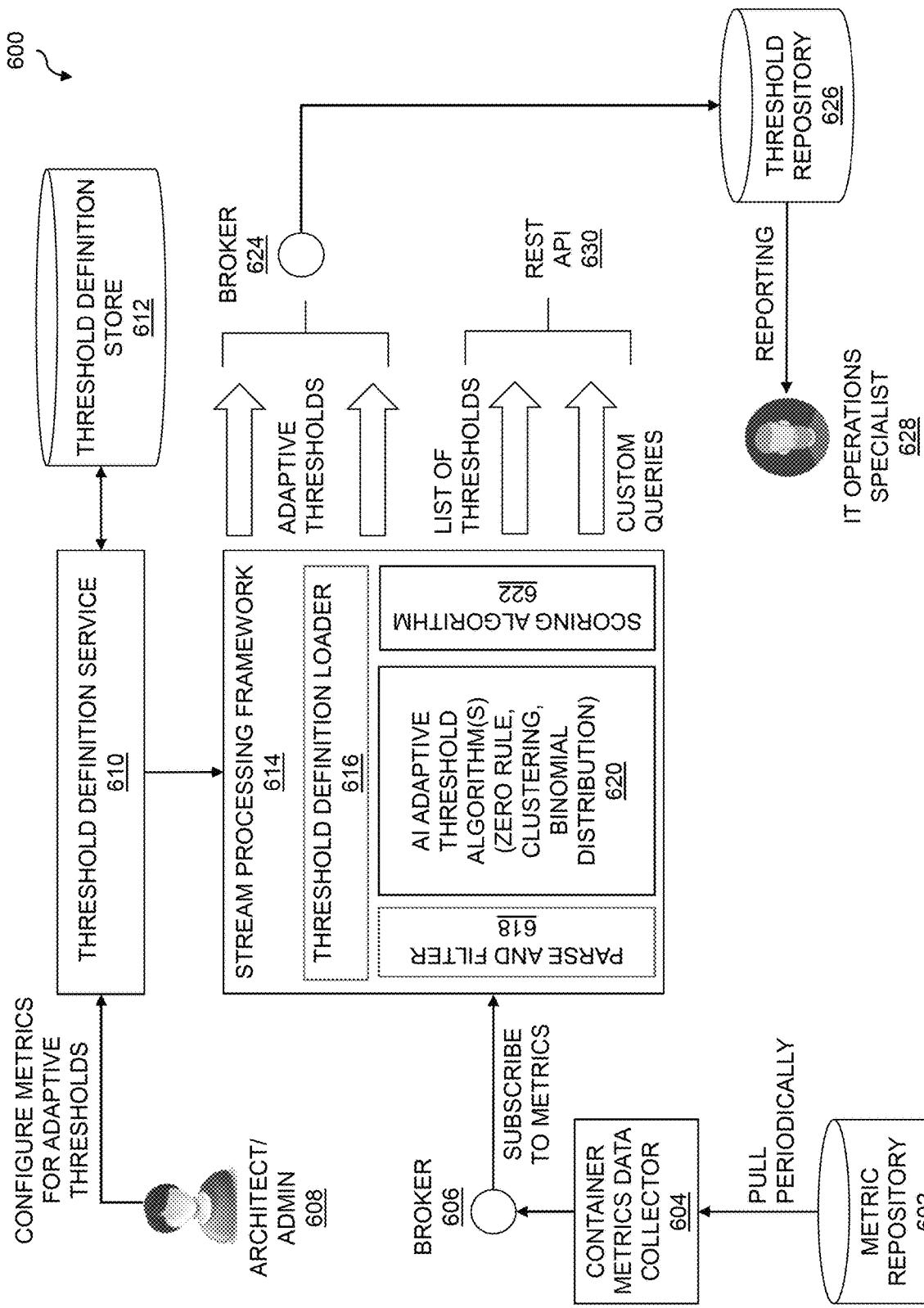
FIG. 6 shows an architecture of an information processing system for generating adaptive thresholds for containers in an illustrative embodiment.

FIG. 6 shows an architecture of an information processing system 600 for generating adaptive thresholds for containers. The system 600 includes a metric repository 602, which may store historical container metrics as described above. A container metrics data collector 604 periodically (e.g., every 12 hours) pulls container metrics from the metric repository 602. The collected metrics are stored in a broker 606, which may be implemented as an Apache KAFKA® broker in some embodiments. The broker 606 is configured to receive metrics from the container metrics data collector 604 and stores the container metrics in specified locations. For example, when implemented as a KAFKA® broker, the broker 606 may organize the container metrics in topics, where the container metrics data collector 604 acts as a producer which pushes messages into topics stored in partitions with particular offsets. In this embodiment, the stream processing framework 614 described in further detail below acts a consumer that pulls messages (e.g., particular subscribed container metrics) by topic, partition and offset.

A system architect or administrator 608 configures the container metrics for which adaptive thresholds are to be generated, such as utilizing a threshold definition service 610. The threshold definition service 610 may also utilize data from a threshold definition store 612, which includes templates for container metrics monitoring and analysis. In some embodiments, the threshold definition service is implemented as a set of representational state transfer (REST) application programming interfaces (APIs), collectively providing a service that allows endpoints to define and deploy policy templates for container monitoring.

Stream processing framework 614 includes a threshold definition loader 616, which loads configuration data from the threshold definition service 610 specified by the system architect 608. The stream processing framework 614 receives container metric data by subscribing to container metrics (e.g., availability and performance metrics for containers) from the broker 606. When broker 606 is implemented as a KAFKA® broker, the stream processing framework 614 may subscribe to the container metrics by pulling messages by topic, partition and offset as described above. In some embodiments, the stream processing framework 614 is implemented as an Apache FLINK® Core stream processing framework.

The stream processing framework 614 includes a parse and filter module 618, which receives the threshold definitions from threshold definition loader 616 as well as the subscribed metrics from broker 606. The parse and filter module 618 provides formatted container metric data to AI adaptive threshold algorithms 620. The parse and filter module 618 in some embodiments decodes, filters, and transforms incoming container metric data from various data sources (e.g., historical container metric data from metric repository 602, telemetry data from container monitoring tools, etc.) into a format suitable for processing using the machine learning or AI-driven algorithms 620. Such AI-driven algorithms may include zero rule, clustering and binomial distribution algorithms that generate ranges or other measures of normal container behavior for a designated time period. This information is provided to the scoring algorithm 622, which combines and weights the different AI-driven data to generate predictive or adaptive thresholds. Use of the scoring algorithm 622 provides various advantages. For example, container monitoring tools that use only a single method or algorithm for a performance metric (e.g., network, application, user experience, business data, etc.) to characterize normal behavior may assume a classic "bell-shaped" distribution based on a number of standard deviations from the mean. Such approaches lack the ability to dynamically determine when container metrics are not normal. The scoring algorithm 622, however, analyzes different types of data and determines performance profiles based on a full history of different container metrics from a datacenter operations repository such as metric repository 602.

The adaptive thresholds generated by scoring algorithm 622 may be provided to another broker 624, which similar to broker 606 may be implemented as a KAFKA® broker. A threshold repository 626 obtains the adaptive thresholds from broker 624. The information from threshold repository 626 is used to generate reports provided to an IT operations specialist 628. One or more REST APIs 630 may be used to obtain data from the stream processing framework 614, such as lists of thresholds. Various users (e.g., architect 608, IT operations specialist 628, etc.) may also submit custom queries to the stream processing framework 614 using the REST APIs 630 for obtaining adaptive thresholds for container metrics.

Figure 7:
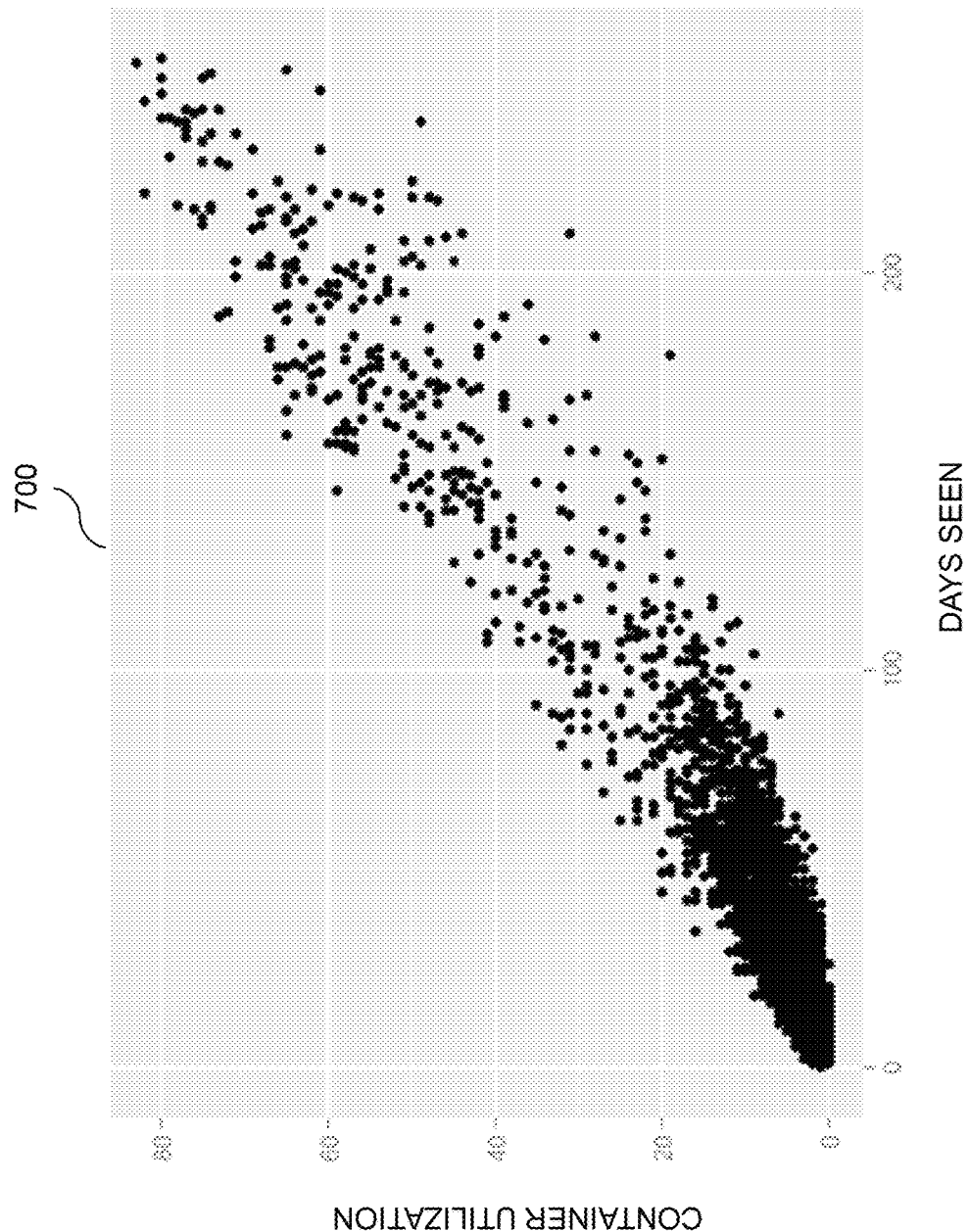
FIG. 7 shows a plot of container utilization metrics as a function of days seen in an illustrative embodiment.

An example of determining adaptive thresholds for linear container metrics will now be described with respect to FIGS. 7 and 8. In this example, the goal is to determine how fast a container moves through different utilization levels on average. FIG. 7 shows a plot 700 of container utilization versus days seen (e.g., a number of days the container has been active and running). To do this, a linear function may be used to create a linear model for characterizing the relationship between the number of days a container has been running and container utilization. Therefore, the model is based on the following linear regression formula:

$$\text{Utilization} = x + y * \text{time\_interval} + \text{noise}$$

where x denotes a level of utilization when a container is started, and y denotes an estimate of utilization expected at the end of each time interval (e.g., each second, minute, hour, day, etc.) The numbers x and y are thus coefficients of the model, which may be estimated based on a training data set such as that shown in the table 800 of FIG. 8. Based on the above regression model and sample data, the model estimates that container utilization will move up by n levels based on n number of time intervals (e.g., seconds, minutes, hours, days, etc.). The n levels can be input to determine threshold levels for the container utilization metric.

It should be appreciated that the above discussion regarding generation of a linear regression model is presented by way of example only, and that embodiments are not limited solely to utilizing linear regression models. Various other types of regression models may be used, including nonlinear regression models, Bayesian methods, percentage regression, quantile regression, nonparametric regression, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating adaptive thresholds for containers will now be described in greater detail with reference to FIGS. 9 and 10. Although described in the context of system 100, these platforms may also be used to implement at least portions of other information processing systems in other embodiments.

Figure 9:
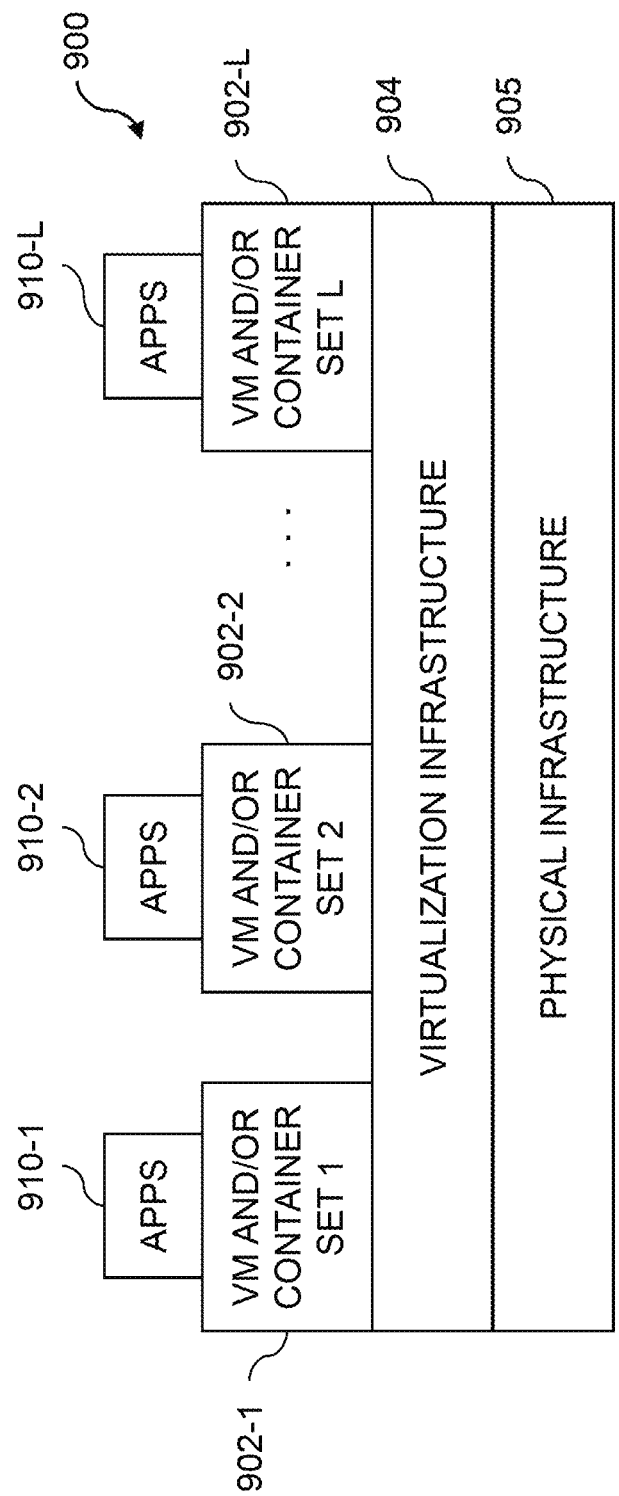
FIGS. 9 and 10 show examples of processing platforms that may be utilized to implement at least a portion of an information processing system in illustrative embodiments.
Figure 10:
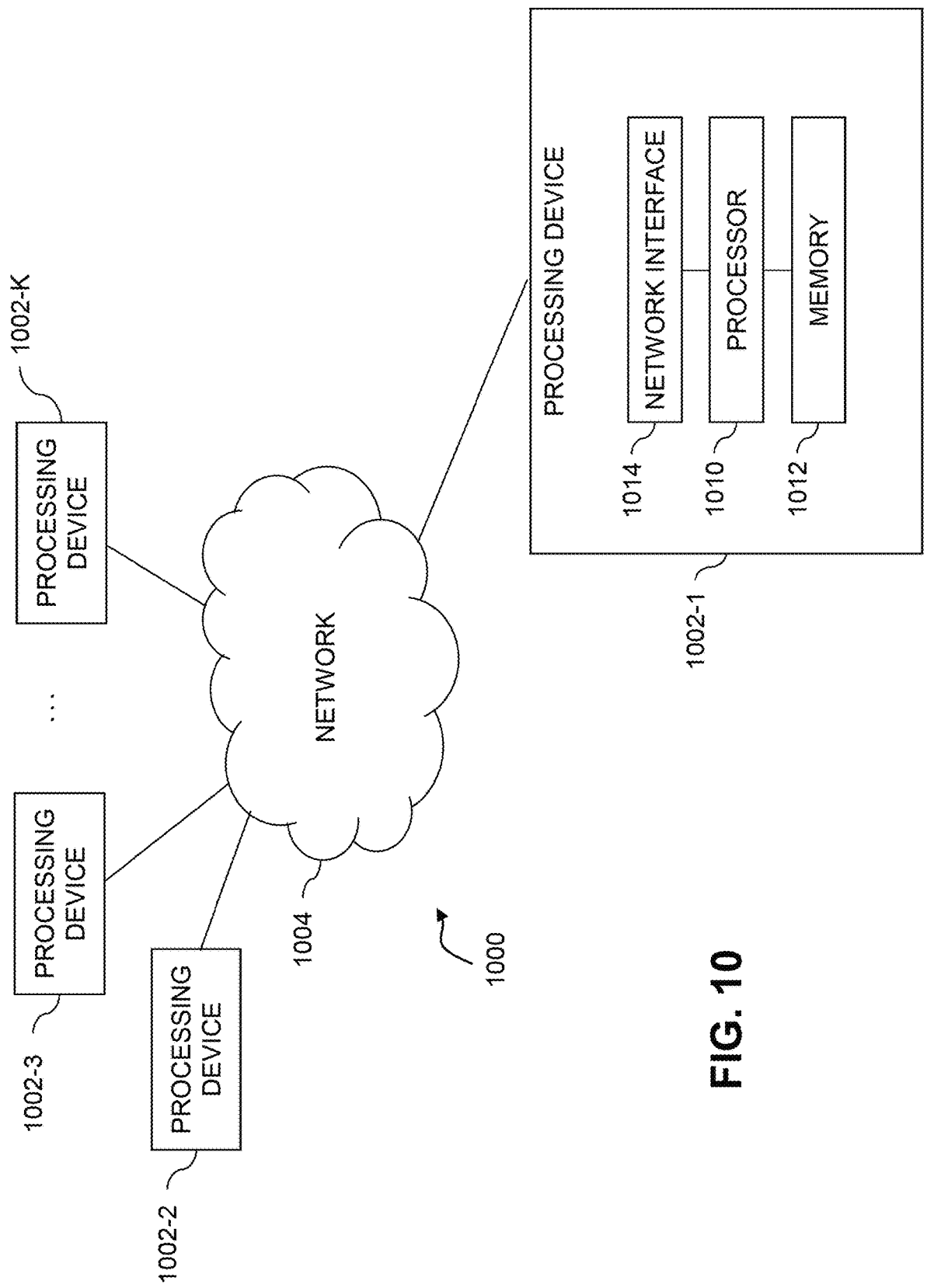

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the adaptive threshold generation functionality as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, AI-driven algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   identifying a set of container metrics for a plurality of containers running in a container environment;
   collecting container data for the plurality of containers;
   generating an adaptive threshold for at least a given one of the identified container metrics, the adaptive threshold specifying one or more values for the given container metric for a designated time period, the adaptive threshold being generated utilizing a scoring algorithm that determines a range of accepted container behavior for the designated time period by analyzing the collected container data using two or more different machine learning algorithms;
   monitoring behavior of the plurality of containers during the designated time period utilizing the adaptive threshold; and
   generating an alert responsive to detecting that the monitored behavior of at least a given one of the plurality of containers is outside the range of accepted container behavior for the designated time period specified by the given adaptive threshold for the given container metric;
   wherein generating the adaptive threshold comprises:
      generating two or more different predictions of an expected range of container behavior for the designated time period utilizing the two or more different machine learning algorithms; and
      combining the two or more different predictions of the expected range of container behavior for the designated time period to generate the determined range of accepted container behavior for the designated time period;
   wherein the method is performed by at least one processing device comprising a processor coupled to a memory.

2. The method of claim 1 wherein the identified set of container metrics comprise one or more state metrics, the one or more state metrics comprising at least one of a number of running containers, a number of available containers, and a number of unavailable containers.

3. The method of claim 1 wherein the identified set of container metrics comprise one or more resource utilization metrics, the one or more resource utilization metrics comprising at least one of central processing unit (CPU) usage, CPU capacity, memory usage, memory capacity, file system usage, and storage input/output (I/O).

4. The method of claim 1 wherein the identified set of container metrics comprise one or more network utilization metrics, the one or more network utilization metrics comprising at least one of network traffic in, network traffic out, network traffic volume, network traffic count, and dropped packets.

5. The method of claim 1 wherein the identified set of container metrics comprise one or more application metrics, the one or more application metrics comprising at least one of session errors, response times, and error rates.

6. The method of claim 1 wherein collecting the container data comprises:
   classifying the container data as being associated with designated types of container metrics; and
   clustering the classified container data by time period.

7. The method of claim 6 wherein collecting the container data further comprises aggregating the clustered container data to one or more of a set of designated key performance indicators (KPIs) for the plurality of containers.

8. The method of claim 1 wherein the two or more machine learning algorithms for determining the range of accepted container behavior comprise two or more of a zero rule classification algorithm, a clustering algorithm, and a binomial distribution algorithm.

9. The method of claim 1 further comprising repeating the collecting, generating the adaptive threshold and monitoring for each of a plurality of designated time periods, wherein the generated adaptive threshold for a first one of the plurality of designated time periods is different than the generated adaptive threshold for at least a second one of the plurality of designated time periods.

10. The method of claim 1, further comprising, responsive to generating the alert, at least one of:
    adjusting a number of running containers in the container environment;
    migrating one or more of the plurality of containers from a first container host device to a second container host device; and
    modifying an amount of one or more compute, storage and network resources of at least one container host device that are allocated to the plurality of containers.

11. The method of claim 1 wherein identifying the set of container metrics comprises receiving, at a stream processing framework from a threshold definition service, configuration information for adaptive thresholds based at least in part on a set of adaptive threshold configuration templates obtained from a threshold definition data store.

12. The method of claim 11 wherein collecting the container data comprises the stream processing framework utilizing the configuration information to subscribe to the identified set of container metrics from at least one broker, the at least one broker periodically pulling the container data from at least one of a metric repository and one or more container monitoring tools.

13. The method of claim 12 wherein generating the adaptive threshold comprises the stream processing framework parsing and filtering the subscribed container metrics, utilizing the two or more different machine learning algorithms to generate the two or more different predictions of the expected range of container behavior, and applying the scoring algorithm to the two or more different predictions of the expected range of container behavior to determine the range of accepted container behavior and to generate the adaptive threshold based at least in part on the determined range of accepted container behavior for the designated time period.

14. The method of claim 13 wherein monitoring the behavior of the containers for the designated time period comprises at least one of:
the stream processing framework providing the adaptive threshold to the at least one broker and the at least one broker providing the adaptive threshold to a threshold repository that generates reports of container behavior; and
the stream processing framework exposing the adaptive threshold via one or more representational state transfer (REST) application programming interfaces (APIs) to one or more container monitoring tools.

15. A computer program product comprising a non-transitory processor-readable storage medium having stored therein program code of one or more software programs, wherein the program code when executed by at least one processing device cause the at least one processing device:
to identify a set of container metrics for a plurality of containers running in a container environment;
to collect container data for the plurality of containers;
to generate an adaptive threshold for at least a given one of the identified container metrics, the adaptive threshold specifying one or more values for the given container metric for a designated time period, the adaptive threshold being generated utilizing a scoring algorithm that determines a range of accepted container behavior for the designated time period by analyzing the collected container data using two or more different machine learning algorithms;
to monitor behavior of the plurality of containers during the designated time period utilizing the adaptive threshold; and
to generate an alert responsive to detecting that the monitored behavior of at least a given one of the plurality of containers is outside the range of accepted container behavior for the designated time period specified by the given adaptive threshold for the given container metric;
wherein generating the adaptive threshold comprises:
generating two or more different predictions of an expected range of container behavior for the designated time period utilizing the two or more different machine learning algorithms; and
combining the two or more different predictions of the expected range of container behavior for the designated time period to determine the range of accepted container behavior for the designated time period.

16. The computer program product of claim 15 wherein:
identifying the set of container metrics comprises receiving, at a stream processing framework from a threshold definition service, configuration information for adaptive thresholds based at least in part on a set of adaptive threshold configuration templates obtained from a threshold definition data store; and
collecting the container data comprises the stream processing framework utilizing the configuration information to subscribe to the identified set of container metrics from at least one broker, the at least one broker periodically pulling the container data from at least one of a metric repository and one or more container monitoring tools.

17. The computer program product of claim 16 wherein:
generating the adaptive threshold comprises the stream processing framework parsing and filtering the subscribed container metrics, utilizing the two or more different machine learning algorithms to generate the two or more different predictions of the expected range of container behavior, and applying the scoring algorithm to the two or more different predictions of the executed range of container behavior to determine the range of accepted container behavior and to generate the adaptive threshold based at least in part on the determined range of accepted container behavior for the designated time period; and
monitoring the behavior of the containers for the designated time period comprises at least one of:
the stream processing framework providing the adaptive threshold to the at least one broker and the at least one broker providing the adaptive threshold to a threshold repository that generates reports of container behavior; and
the stream processing framework exposing the adaptive threshold via one or more representational state transfer (REST) application programming interfaces (APIs) to one or more container monitoring tools.

18. An apparatus comprising:
at least one processing device comprising a processor coupled to a memory;
the at least one processing device being configured:
to identify a set of container metrics for a plurality of containers running in a container environment;
to collect container data for the plurality of containers;
to generate an adaptive threshold for at least a given one of the identified container metrics, the adaptive threshold specifying one or more values for the given container metric for a designated time period, the adaptive threshold being generated utilizing a scoring algorithm that determines a range of accepted container behavior for the designated time period by analyzing the collected container data using two or more different machine learning algorithms;
to monitor behavior of the plurality of containers during the designated time period utilizing the adaptive threshold; and
to generate an alert responsive to detecting that the monitored behavior of at least a given one of the plurality of containers is outside the range of accepted container behavior for the designated time period specified by the given adaptive threshold for the given container metric;
wherein generating the adaptive threshold comprises:
generating two or more different predictions of an expected range of container behavior for the designated time period utilizing the two or more different machine learning algorithms; and
combining the two or more different predictions of the expected range of container behavior for the designated time period to determine the range of accepted container behavior for the designated time period.

19. The apparatus of claim 18 wherein:
identifying the set of container metrics comprises receiving, at a stream processing framework from a threshold definition service, configuration information for adaptive thresholds based at least in part on a set of adaptive threshold configuration templates obtained from a threshold definition data store; and
collecting the container data comprises the stream processing framework utilizing the configuration information to subscribe to the identified set of container metrics from at least one broker, the at least one broker periodically pulling the container data from at least one of a metric repository and one or more container monitoring tools.

20. The apparatus of claim 19 wherein:
generating the adaptive threshold comprises the stream processing framework parsing and filtering the subscribed container metrics, utilizing the two or more different machine learning algorithms to generate the two or more different predictions of the expected range of container behavior, and applying the scoring algorithm to the two or more different predictions of the executed range of container behavior to determine the range of accepted container behavior and to generate the adaptive threshold based at least in part on the determined range of accepted container behavior for the designated time period; and
monitoring the behavior of the containers for the designated time period comprises at least one of:
 the stream processing framework providing the adaptive threshold to the at least one broker and the at least one broker providing the adaptive threshold to a threshold repository that generates reports of container behavior; and
 the stream processing framework exposing the adaptive threshold via one or more representational state transfer (REST) application programming interfaces (APIs) to one or more container monitoring tools.

* * * * *